United States Patent [19]

Schisselbauer et al.

[11] 3,896,294

[45] July 22, 1975

[54] PLURAL MODE CARD READING APPARATUS

[75] Inventors: John C. Schisselbauer, Southampton; James P. Jacobs, Phoenixville, both of Pa.

[73] Assignee: Peripheral Dynamics, Inc., Norristown, Pa.

[22] Filed: Sept. 5, 1973

[21] Appl. No.: 394,547

[52] U.S. Cl..... 235/61.11 E; 235/61.12 R; 250/568

[51] Int. Cl.²...G06K 7/10; G06K 7/14; G06K 19/06

[58] Field of Search.... 235/61.7 B, 61.11 E, 61.6 E, 235/61.12 N, 61.11 R; 340/149 A, 173 LT; 271/114; 179/15 BS; 250/566, 568, 569, 570

[56] References Cited

UNITED STATES PATENTS

| | | | |
|---|---|---|---|
| 3,184,581 | 5/1965 | Willoughby | 179/15 BS |
| 3,331,947 | 7/1967 | Johnson | 235/61.11 D |
| 3,341,691 | 9/1967 | Modersohn | 235/61.11 E |
| 3,463,906 | 8/1969 | Chiang | 235/61.11 E |
| 3,474,232 | 10/1969 | Hearn | 235/61.11 E |
| 3,655,945 | 4/1972 | Bowen | 235/61.12 R |
| 3,700,858 | 10/1972 | Murthy | 235/61.11 E |
| 3,712,973 | 1/1973 | Karl | 235/61.11 R |
| 3,751,639 | 8/1973 | Searle | 235/61.11 E |

OTHER PUBLICATIONS

Seesing, G. H.–"Card Reader"; IBM Technical Disclosure Bulletin Vol. 5, No. 12, p. 75, May 1963

*Primary Examiner*—Daryl W. Cook
*Assistant Examiner*—Robert M. Kilgore
*Attorney, Agent, or Firm*—Bowie, Benasutti and Preston

[57] ABSTRACT

Card reading apparatus is adapted to read either punched hole cards or marked cards, and is further adapted to read cards with information encoded in either the conventional 80 columns or 40 columns. A delay circuit is incorporated to adjust the timing signals for reading out sensed information, so as to facilitate switching from hole sense reading to mark sense reading. Adjustment between 80 column mode reading and 40 column mode reading is achieved by logic operations performed in the readout timing signals.

9 Claims, 7 Drawing Figures

PLURAL MODE CARD READING APPARATUS

BACKGROUND OF THE INVENTION

1. Field of the Invention

This invention lies in the field of apparatus and methods for reading data processing cards containing encoded information and, more particularly, improved apparatus for reading cards with different encoding schemes.

2. Description of the Prior Art

The use of paper cards, commonly known as IBM type cards, has been widespread in electronic data processing systems for many years. Such cards, hereinafter referred to as data cards, have become an accepted and standard vehicle for encoding information in a form which it can be "read", i.e., decoded in a form suitable for generating digital electric signals for use in computers and other electronic data processing applications. The widespread use of such data cards has promoted, among other things, a substantial commercial market for card readers, or apparatus adapted to efficiently read cards on which information has been encoded and to generate corresponding digital signals. With the growing commercial demand for such card readers, there has also been an increasing demand and commercial need for card readers which are more efficient, quicker, and more flexible, i.e., adapted to read information which has been placed on such data cards in any one of a variety of different ways.

The need for such flexibility in reading data cards arises from the fact that such cards are used in an enormous variety of applications, and different applications are necessarily better suited for different means of encoding information onto such cards. Two standard and long used techniques for encoding information onto data cards are those of punching holes into the cards, and marking the cards with pencil marks suitable for detection by optical reading equipment. The first method of encoding, namely punching holes in the cards, is known as the transmissive mode of encoding, and that term will be used hereinafter in this application. In the transmissive mode of encoding, the presence or absence of a punched hole at a given location represents a bit of information, and such bit of information is conventionally read by determining whether a light source directed at such location is transmitted through a hole or is blocked (by the absence of a hole in the card) as the card is transported past suitable detection means. In the second type of encoding, a mark is or is not placed at a given location on the data card, and the presence or absence of such a mark similarly constitutes a bit of information. In reading such a card, a mark is either sensed or not at a given location, and an accompanying electrical signal representing the bit of information is generated. In reading a mark, a light source is directed toward the location in question, and the amount of light reflected at a given location is sensed. The card is a good reflector, and when the mark passes by the point where the light is directed, there is a decrease in the amount of reflected light. Similarly, the presence of a hole can be detected by measuring a decrease in reflected light, since the incident light passes directly through the hole. This mode of encoding and decoding data cards is referred to as the reflective mode. As used in this specification hereinafter, both the terms "transmissive mode" and "reflective mode" will refer to modes where the cards are read, or decoded, as described hereinabove.

Since the technique of reading in the reflective mode differs fundamentally from the technique for reading in the transmissive mode, many card readers are adapted to handle only one or the other mode. This, of course, limits the usefulness of the card reading apparatus. The problem can be solved by the simple expedient of duplicating the apparatus required for handling the two different modes, but such sheer duplication results in an expensive piece of equipment, and there is a great commercial need for apparatus having an efficient design for adapting it to read either type of encoded card, and in either mode.

With respect to card readers adapted to read in the reflective mode, there have been a number of outstanding design defects and problems which prior art equipment have not satisfactorily solved. For example, the problem of erasures in the operation of marking cards has long plagued the data processing industry. The problem is that once a mark has been made on the card, the erasure may not be sufficiently complete to ensure that the location will not be sensed as containing a mark in spite of the erasure. Another problem in the reflective mode of operation is referred to as the "mirror effect", in which the type of pencil or other marking instrument which is used leaves a mark which mirrors, or reflects light, instead of absorbing light at the point of the mark, such that the mark is not adequately sensed by the detector. Other problems which occur in the reflective mode of operation include sensitivity of the reading apparatus to the color of the card and the degree of card flutter (i.e., vertical movement) as the card is transported past the detection position. The prior art contains many card reader designs which contain solutions of various degree of success to these problems, but there remains a definite need in the area for improvement so as to increase the reliability of the card reading operation to the greatest extent possible.

Another problem attendant to the mark sensing operation is due to inevitable human error in placing the marks on the cards. As is well known, in a normal data card where 80 columns are used, the marks in any given column must be closely confined within that column so that they are not confused in the detection process with marks in adjacent columns. It is inevitable that personnel who are marking the cards will place the marks with varying degree of trueness within the narrow column where they should be placed, causing unreliability in the total operation of encoding and decoding information. There is thus a great need for increasing the reliability of the marking and sensing operation. Applicants' invention meets this need by a novel technique which permits greater marking error in terms of the left-right position within the column where the mark must be placed. Another way of stating it is that the technique permits a greater "window" within which the mark may be placed without any ambiguity in the card reading operation.

From the above, it is seen that there exists a substantial need for an improved commercial card reader product which contains means for reducing the present problems in the art, and which provides increased flexibility in being able to read cards which are encoded in a plurality of different ways.

SUMMARY OF THE INVENTION

The primary object of this invention is to provide improved card reader apparatus which reads information encoded on data cards with greater reliability than prior art apparatus, and which has an improved facility for reading cards carrying information encoded in different modes.

It is another object of this invention to provide an improved method for reflective mode reading of data cards.

It is a further object of this invention to provide an inexpensive and reliable improvement in card reading apparatus whereby cards encoded in either an 80 column mode or 40 column mode may be reliably read.

It is a further object of this invention to provide improved card reading apparatus for reading cards in the reflective mode which improves on the existing ability to discriminate erasures, and which reduces mirror effect, sensitivity to color of the card, and ambiguity due to card flutter.

In accordance with the above objectives, there is disclosed apparatus adapted for reading data cards in either the transmissive mode or reflective mode, and having means for converting the encoded information on the cards to electrical signals carrying such information, including means for sensing secondary reflected light from the cards. Signal processing means are incorporated in the apparatus for processing the electrical information signals to provide digital signals representative of such encoded information, which means includes timing means synchronized in a first time relationship to the passage of the cards through the apparatus for processing of cards read in the transmissive mode and synchronized in a second time relationship for processing cards read in the reflective mode. The signal processing means is further characterized by a method and means making the card reader apparatus adaptable for providing different windows between adjacent encoded columns on the card.

DESCRIPTION OF THE PREFERRED EMBODIMENT

Figure 1:
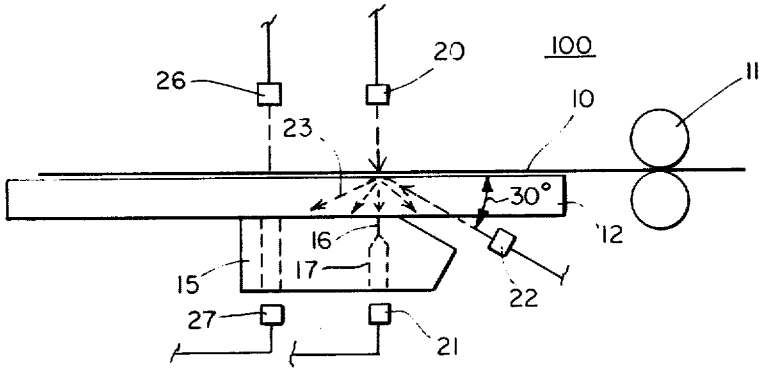
FIG. 1 is a schematic diagram showing the essential features of the transport mechanism and card reading apparatus of this invention.

Referring now to FIG. 1, there is shown a schematic diagram which illustrates the configuration of the apparatus used in sensing cards transported through the card reading apparatus 100 of this invention. There is indicated schematically at 11 a transport mechanism, typically a system of drive rollers, for feeding the data card 10 through the card reader for the reading operation. Typically, the card 10 is fed across the surface of a glass element 12. Below element 12 is mounted an insert block 15, suitably made of machined aluminum, which in turn is mounted within a phenolic block (not shown). Insert block 15 contains machined therein a slit 16 (typically 0.010 inches in width) which opens toward the glass element 12, and which leads at its opposite end to a machined opening 17. In registry with the lower end of opening 17 is a detector 21, suitably a light sensitive semiconductor element, for detecting the presence of light which is transmitted through slit 16 and opening 17. Positioned above element 12, and in registry with slit 16, is a light source, suitably a light emitting diode (LED), which directs a source of light toward the card 10 as indicated. Source 20, detector 21, slit 16 and opening 17 are all positioned in registry such that when an opening in card 10 passes between source 20 and detector 21, a pulse of light is detected at detector 21. This mechanism is well known and adopted generally in card reading apparatus designed for transmissive mode operation.

Also mounted below glass element 12 is another light source 22 (also suitably an LED), mounted to direct light toward the passing card 10 in the manner as indicated. Source 22 directs light at an angle with respect to the surface of glass element 12 across which the card 10 passes, such that the directly reflected light is directed as shown at 23, and does not enter slit 16. Light source 22 is further directed such that the light transmitted therefrom strikes the card 10 at substantially the underside of the point where light transmitted from source 10 strikes the card. As indicated in FIG. 1, although the directly reflected light angles off as shown at 23, a certain proportion of the light from source 22 is scattered downwardly toward slit 16, such that it can be detected at detector 21. The cooperative arrangement of source 22 and detector 21 provides for detection of secondary scattered light reflected downward from the passing card 10. This arrangement is used in the apparatus of this invention for detecting marks on the card 10 in the reflective mode of operation, and aids in providing unambiguous sensing of penciled marks. The amount of such secondary scattered light is relatively independent of the possible position of card 10 with respeect to the upper surface of glass element 12, and thus is relatively independent of card "flutter", thus reducing unreliability due to card flutter caused by inadequacies of the transport mechanism. Furthermore, by sensing secondary reflected light, the sensed signals are less sensitive to the color of the card (or the relative color difference between the mark and the card) and to mirror effect.

It is to be appreciated that in practice sources 20 and 22 respectively each comprise a series of light sources in a configuration such as to detect the presence or absence of encoded information at each row corresponding to the column which is being read. Thus, for a typical data card containing 12 rows, there are 12 light source elements 20 and 12 light source elements 22. Correspondingly, there are 12 detector elements 21, each of which senses a one bit signal each time an encoded column of the card is moved through the card reader.

Still referring to FIG. 1, there is shown at 26 another light source (also suitably as LED), which is an registry with detector 27 positioned on the opposite side of the card and glass element 12 from light source 26. The combination of source 26 and detector 27 enables detection of the leading edge of the card, so as to generate a leading edge signal when the leading edge of the card is in registry with the line between elements 26 and 27. The leading edge signal is the signal which initiates the basic timing for processing the information signals which are read by the card reader apparatus.

The mechanism by which the leading edge signal is used to generate timing signals for processing the information read at detector 21 is standard, and as such does not comprise part of this invention. However, for purposes of clarity of disclosure, a brief description, without drawings, is included herewith. The apparatus includes a timing gear (not shown) which generates timing pulses at a sufficiently high rate to provide the degree of timing resolution as is required for the card reading process. When the leading edge signal is generated at element 27, the timing pulses are gated into a counter. At predetermined counts, reset signals are generated for resetting the storage locations in a register 50 (see FIG. *3a*), in which locations the bit information from detectors 21 are periodically stored following the reading of each column. At a second predetermined count, strobe signals are generated, for gating out of register 50 the signals which have been stored therein. This aspect of the apparatus is discussed in greater detail hereinbelow, in connection with the technique for adapting the apparatus to read either 80 column or 40 column encoded cards.

Referring now to FIG. *2a*, there is shown a block diagram illustrating the apparatus for generating electrical signals representative of sensed card information. The configuration of *2a* is uniquely designed to provide a signal which reliably indicates either the presence of a hole in the card (transmissive mode of operation) or the presence of a hole or an unambiguous mark in the mark sense (reflective) mode of operation. Block 30 represents the sensing step as accomplished at detector 21 (FIG. 1). The sensed electrical signal is connected to amplifier means 31, consisting of conventional amplifier blocks for amplifying the signal. The output of amplifier 31 is indicated as appearing at point A, and is illustrated in diagram (i) of FIG. *2b* for the reflective mode of operation and in diagram (iv) for the transmissive mode of operation. The output from amplifier 31 is passed through a differentiating circuit 32, the output of which is illustrated at diagram (ii) for the reflective mode of operation and (v) for the transmissive mode of operation. The output of differentiation circuit 32 is in turn passed through a level detector 33, which is biased to detect the differentiated signal when it has moved negative by a predetermined amount (as indicated in waveforms (ii) and (v) ). The output of the level detector 33 is indicated at point C, and is illustrated in waveform (iii) for the reflective mode and in waveform (vi) for the transmissive mode.

In operation, the differentiation circuit 32 modifies the detected signal in such a way as to provide a signal representative of the sharpness of the edges of the mark which has been sensed. In this respect, it is to be understood that where a mark has been erased, even though the intensity of the mark may remain substantial due to ineffective erasure, the edges thereof will be considerably smudged or reduced in intensity. In this situation, the output of the differentiator does not rise above a predetermined minimum level unless substantial edges remain, thus increasing the probability that only non-erased marks are sensed. The configuration of FIG. *2a* thus provides means for reducing ambiguity in mark sensing, and is further adaptable for processing detected signals when in transmissive mode operation.

Referring now to FIG. *3a*, there is seen a block diagram of the circuitry for registering sensed data from cards which are transported through the card reader apparatus, and for periodically reading out the data in digital form. A register 50, of conventional design, is connected to the detectors, or sensors 21, and for each column that is read a two-state circuit is set to a 0 or 1 state. Conventional timing generator 51, such as a counter, receives the leading edge (L.E.) signal from element 27, and generates a first output signal which is connected to a reset generator 52 and a second output signal which is connected to a strobe generator 53. The reset generator produces a signal of appropriate form and magnitude to reset the register for receiving information signals corresponding to a column of a card which has been read. The strobe generator produces a suitable strobe signal which is used to gate data out of the register after the period of time during which a column has been read into the register, and before resetting the register for receipt of the next set of signals. As seen in the simplified block diagram of FIG. *3a*, the connection 57 from the register 50 to gate 54 actually represents a plurality of lines, one corresponding to each bit of information read from the 12 row column of the card.

In order to avoid the above-mentioned problem of having a small window (causing ambiguities or mistakes in reading column information), it has been found that the data card can be encoded so as to leave more space between encoded columns, while at the same time enlarging the time period during which the encoded column is read. Thus, by encoding every other column of a standard 80 column card, i.e., 40 column encoding, the physical spacing between adjacent encoded columns is increased. This permits greater latitude for marking, i.e., permits greater error in placing the mark within the desired column, so long as the card reader apparatus is able to be adapted to search for a correspondingly greater time while the card passes through. In other words, if the reset and strobe signals are adjusted so that all marks placed within a two-column width are registered together, the window is effectively expanded to be a two-column window.

Referring to FIG. *3b*, there are shown illustrations of the timing of the reset and strobe signals for reading out 80 column and 40 column data respectively. For 80 column cards, the cycle consists of first resetting the register, and then strobing out the register after a period of time $\Delta T_1$ which allows for reading into the register from the sensors the data from a given column. Shortly after the strobe pulse, the next reset pulse is inputted to the register, to reset it for receipt of the information corresponding to the next column which is passing by the detector mechanism. The periodic timing of the reset and strobe signals corresponds to sensing 80 columns of data from the card. When 40 column encoding has been employed, the even reset signals and odd strobe signals are eliminated, such that there is a greater period of time $\Delta T_2$, or window, during which sensed information can be placed into the register.

Figure 2A:
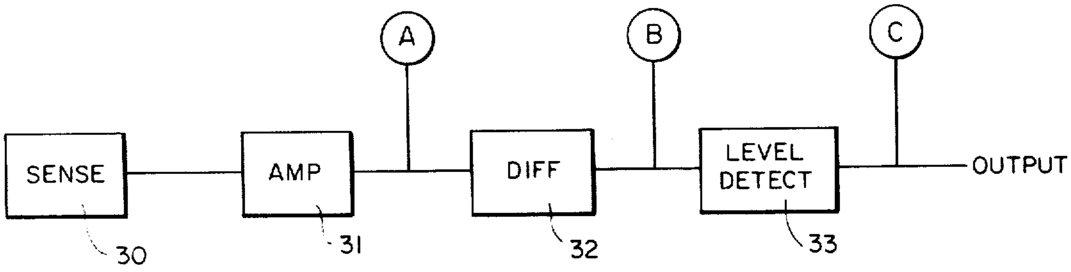
FIG. 2*a* is a block diagram which illustrates circuitry for developing electrical signals representative of encoded card data, as utilized in this invention.
Figure 2B:
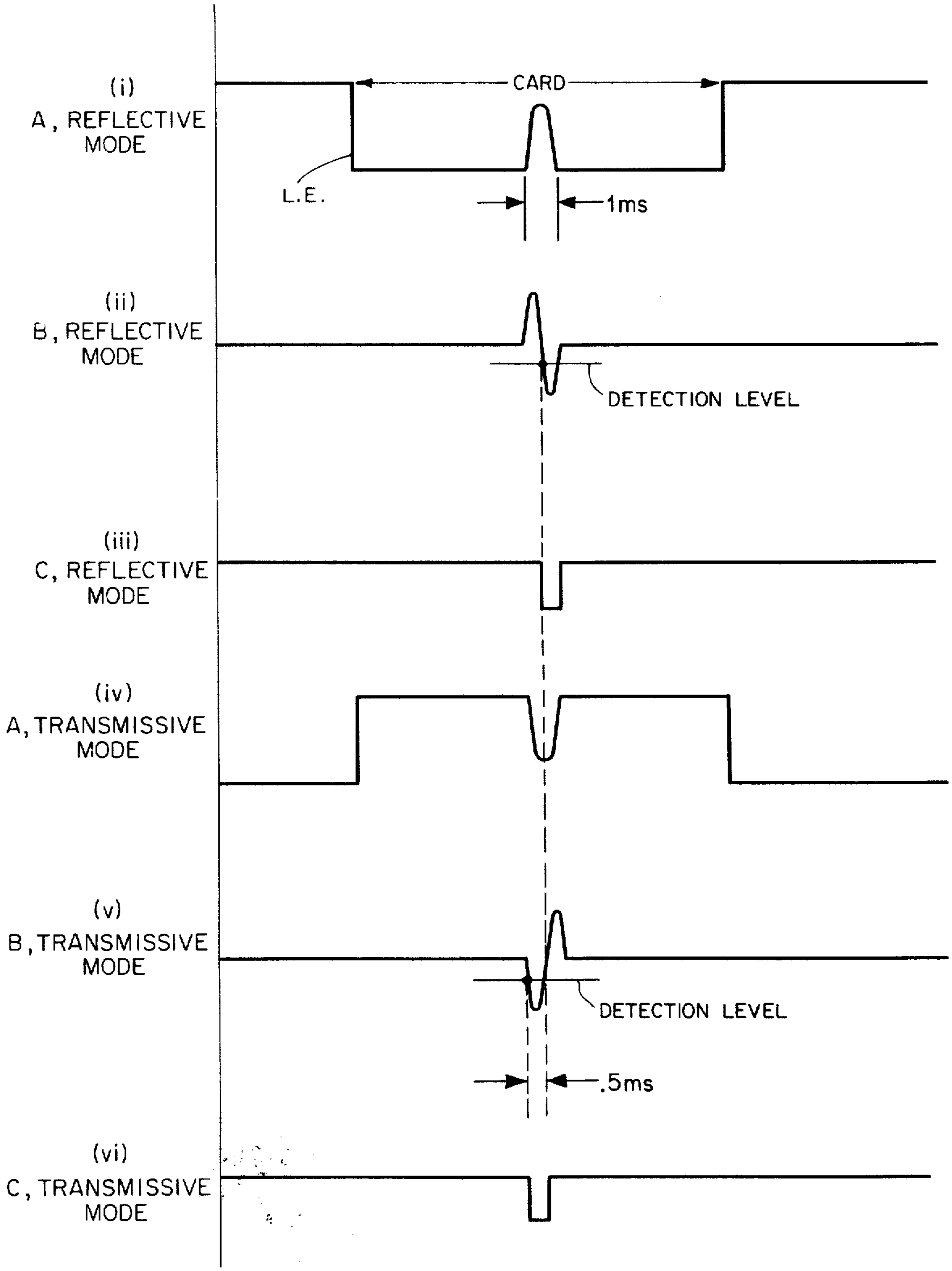
FIG. 2*b* shows a series of diagrams which illustrate the time relationship of signals developed at different points in the block diagram of FIG. 2*a*.

Referring back to FIG. 2*b*, it is noted that the final signal developed (at point C) when in the reflective mode of operation is delayed by a time increment (0.5 ms in the illustrated example) with respect to the corresponding signal when in the transmissive mode. Accordingly, since the timing signals for reading out a detected pulse are synchronized from the leading edge signal, the leading edge signal is delayed by such time increment when in the reflective mode, so that the timing of the reset and strobe signals, relative to the information pulses, is the same in each mode. This is achieved by the circuitry shown in FIG. 4*a*.

Figure 4A:
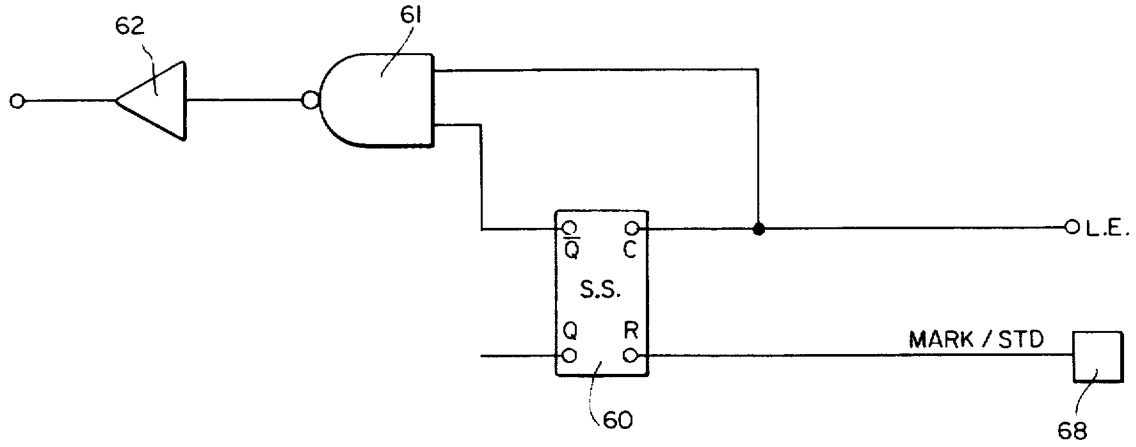
FIG. 4*a* is a block diagram of the apparatus used in generating the leading edge signal as a function of standard (transmissive) or mark sense (reflective) mode of operation, in accordance with this invention.

Referring now to FIG. 4*a*, there is shown a single shot delay circuit 60, suitably available as a standard integrated circuit device, which is utilized in this invention to introduce delay to the leading edge signal. The characteristic of the single shot delay is that when it is held in the reset state (the R terminal at ground) it will at all times provide a high output at terminal $\overline{Q}$. However, when the single shot is placed in the ready or enabled state (R terminal at a high level), an input at the C terminal causes output $\overline{Q}$ to go low for a predetermined delay time and then go high until the next input. The input of terminal R is marked "MARK/STD", and is held low for standard (transmissive) operation and high for the mark sense (reflective) operation. Therefore, the single shot 60 is inhibited for standard operation and is enabled for the mark sense (or reflective) operation. The "MARK/STD" signal is suitably provided by a conventional selection means 68, which may comprise a push button selection switch which is operated manually. The leading edge signal is connected at the input terminal C, and is also connected as a first input to circuit 61. The second input terminal to circuit 61 is connected to the output $\overline{Q}$ of single shot 60. Circuit 61 is characterized by passing the signal at one input terminal in an inverted form when a high signal is connected to the other input signal. The output of circuit 61 is connected to the input of logic gate 62, the output of which constitutes the leading edge signal in either a delayed or non-delayed form.

In practice, when the standard (transmissive) mode of operation is being utilized, the output of circuit 60 remains high, such that the leading edge signal connected to circuit 61 is transmitted in inverted form through to the output. Since logic gate 62 provides further inversion, the output of logic gate 62 is simply the leading edge signal, with no change in timing. When the reflective mode of operation is selected, the output $\overline{Q}$ of circuit 60 goes low when the leading edge signal is first received, such that the leading edge signal is not immediately transmitted through circuit 61 (any race conditions are eliminated by suitable conventional circuitry, not shown). However, after the delay introduced by circuit 60 (0.5 milliseconds for the example) used herein), output $\overline{Q}$ goes high, and the leading edge signal is passed through circuit 61. Thus, the leading edge signal is effectively delayed when the mark sense mode of operation is chosen.

Figure 4B:
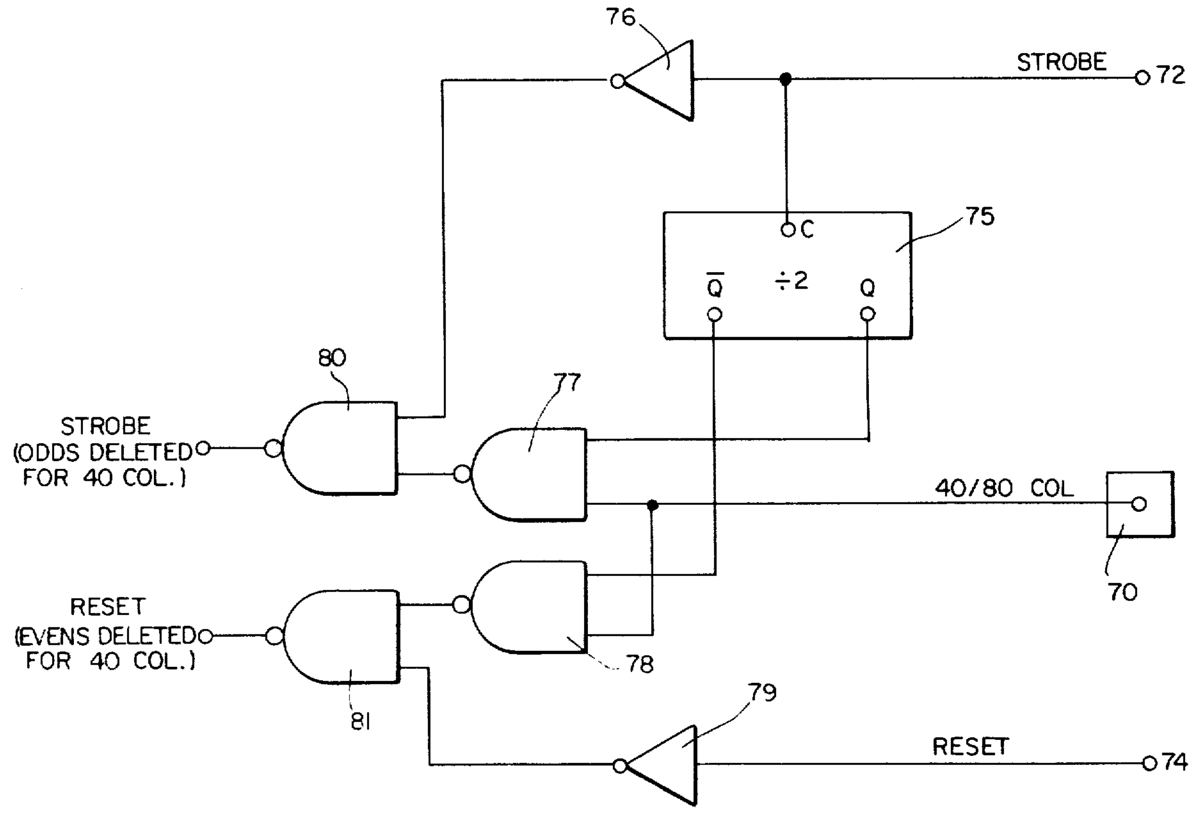
FIG. 4*b* is a block diagram showing the apparatus used for deriving strobe and reset signals as a function of whether the cards being sensed are marked on an 80 column or 40 column basis, in accordance with this invention.

Referring to FIG. 4*b*, there is shown a block diagram of the logic circuitry of this invention for generating strobe and reset signals in accordance with the choice of operating in either the standard 80 column or the 40 column mode. As with FIG. 4*a*, the circuitry shown is simplified to illustrate the required logic, and any additional circuitry which might be required to eliminate race conditions is not shown, as it is well within the skill of the average practitioner in this art to introduce suitable delays to eliminate race conditions. A 40/80 column signal is generated in any suitable manner, such as by opening or closing a switch by operation of a push button, as indicated at block 70. The strobe signal is connected to terminal 74 and the reset signal is connected to terminal 74. The strobe signal is connected to the input terminal C of a conventional divide-by-two counter 75, which counter performs the function of producing a high output at terminal $\overline{Q}$ upon the receipt of a first input at terminal C, at which time Q goes low, and producing a high output at terminal Q after a second signal is received by terminal C, at which time $\overline{Q}$ goes low. Thus, an odd strobe signals, $\overline{Q}$ goes high and Q goes low, and for even strobe signals Q goes high and $\overline{Q}$ goes low. This is the basic mechanism which is used for establishing the timing for deleting the odd strobe signal and the even reset signal when in the 40 column mode.

The output of terminal Q of circuit 75 is connected to the first input of a NAND gate 77, the second terminal of which receives the 40/80 column signal. When in standard 80 column mode, the 40/80 signal is low, and when in 40 column mode, it is high. In 80 column mode of operation, the change of state of terminal Q of circuit 75 is not passed through gate 77, and the output of gate 77 remains high. The high output of 77 is connected to a first input of NAND circuit 80, and the second input terminal is connected to the output of circuit 76 which inverts the strobe signals. The output of 77 holds circuit 80 enabled such that all of the strobe signals are passed through circuit 80, such that for 80 column operation none of the strobe signals are deleted. However, in 40 column operation, the 40/80 signal goes high, and the output of terminal Q of circuit 75 is gated (and inverted) through 77. When the first strobe signal is received at circuit 75, terminal Q is high, and the output of circuit 77 is low, such that the strobe signal is not passed through circuit 80. However, the first strobe signal causes circuit 75 to change state, such that the second strobe pulse is passed through circuit 80. In a similar manner, all odd strobe signals are blocked from passage through circuit 80, and all even strobe signals are passed, so that the output of circuit 80 contains strobe signals with all odd strobe signals deleted.

Figure 3A:
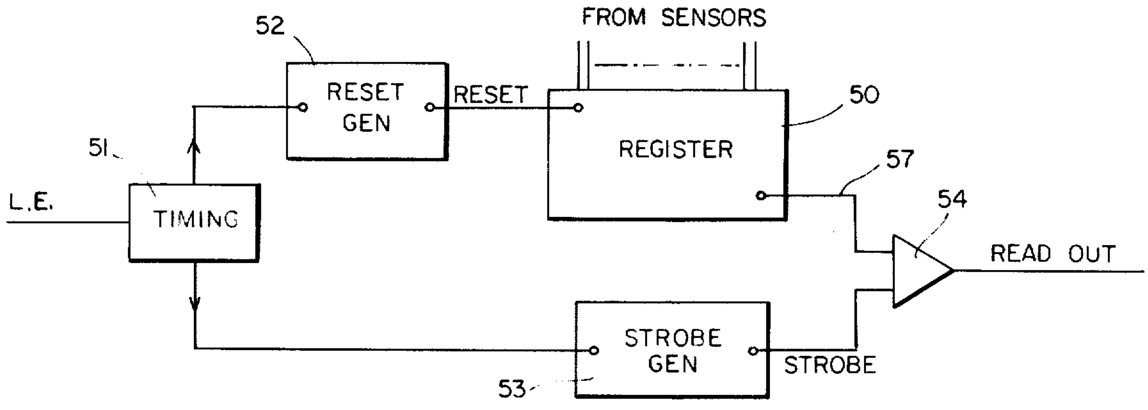
FIG. 3*a* is a simplified block diagram illustrating the manner of reading out sensed information in accordance with this invention.
Figure 3B:
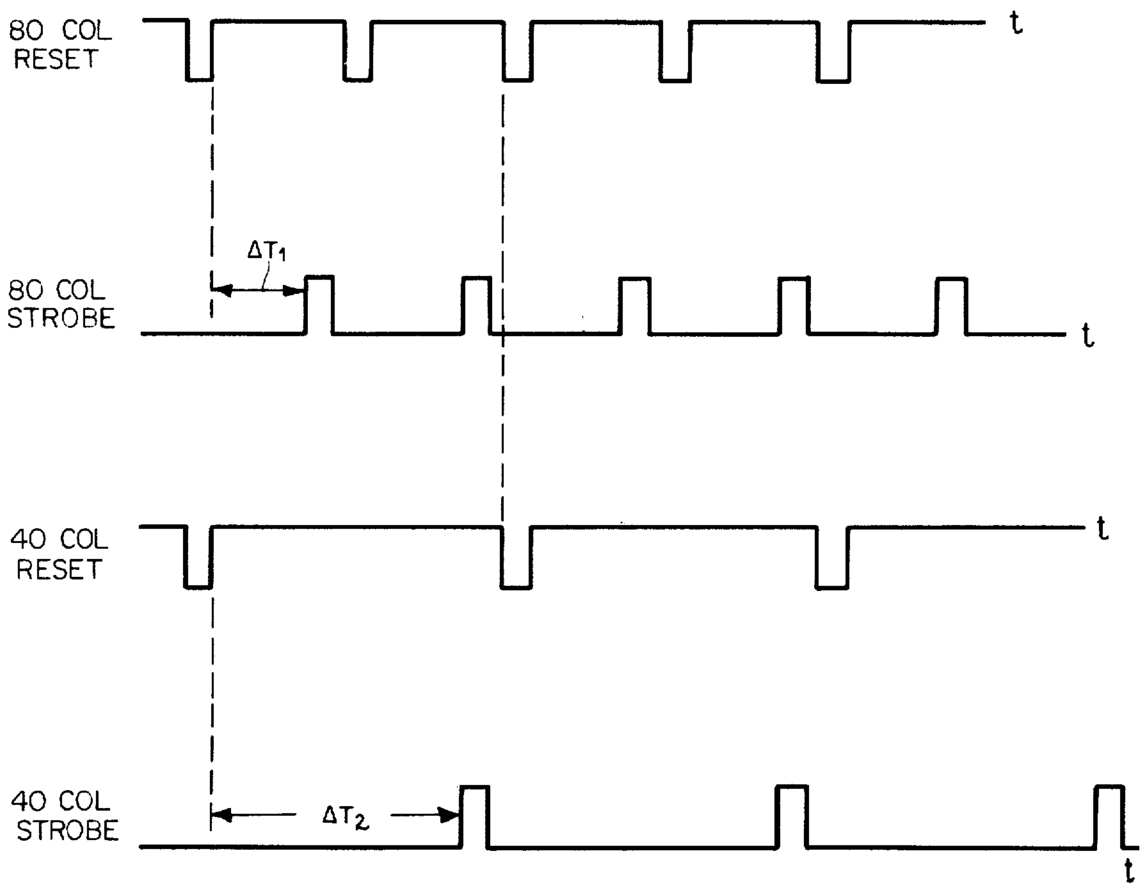
FIG. 3*b* contains four diagrams illustrating the time relationship of reset and strobe signals for given modes of reading, in accordance with the practice of this invention.

The reset signal 74 is inverted by gate 79, the output of which is connected to the first input of gate 81. The output $\overline{Q}$ of circuit 75 is connected to a first input terminal of circuit 78, and the 40/80 column signal is connected to a second input terminal. The output of circuit 78 is connected to the second input of circuit 81. In operation, when 80 column mode is selected, a low signal is placed on one of the input terminals a circuit 78, such that the changing signal at $\overline{Q}$ of circuit 75 does not pass through 78, and the output 78 holds high. This enables all the reset signals to pass through circuit 81. In 40 column mode of operation, a high signal is connected from terminal 70 to one input of 78, such that the output at $\overline{Q}$ of circuit 75 is passed through 78. Under these conditions, the output of 78 goes high after odd strobe pulses, such that even reset pulses are blocked from passing through circuit 81. Thus, in 40 column mode of operation, the odd strobe pulses and the even reset pulses are deleted, as illustrated in FIG. 3*b*.

While the preferred embodiment of the logic circuitry used in this invention has been disclosed herein (without showing appropriate delays to eliminate race conditions), it is to be noted that such logic operations could be practiced in many different ways, and with many different circuit components, and accordingly the invention as claimed fairly embraces other arrangements for performing the same functions which are available in this art.

It is to be recognized that other modes of column selection in addition to 80 and 40, and as applied to standard 80 column cards, can be utilized. For example, by taking one of the outputs from counter 75 and connecting it to the input of the second column, a 4 bit output counter, or effectively a divide-by-four counter could be obtained. Utilizing such a counter, 20 column reading could be achieved, whereby the register would be reset every fourth column, and would be strobed out after a period of time corresponding to a 4 column window. There is thus provided a technique whereby the window column can be varied to accommodate the user's needs.

In the claims which define this invention, the terms "column rate" and "column mode" both refer to the manner of utilizing the columns on a data card. A column rate of 40 refers to utilizing 40 columns of data per card, and a column mode of 40 means the same thing.

We claim:

1. Apparatus adapted for reading both data cards encoded in the transmissive mode and data cards encoded in the reflective mode, comprising:

a. transport means for transporting data cards through said apparatus;

b. transmissive light source means for transmitting light onto transmissive mode cards which are being transported through said transport means;

c. reflective light source means for transmitting light onto reflective mode cards which are being transported through said transport means;

d. detection and conversion means positioned i. relative to said transmissive source means so as to detect light transmitted therefrom through transmissive mode cards which are being transported through said transport means and ii. relative to said reflective source means so as to detect light transmitted therefrom and reflected from reflective mode cards which are being transported through said transport means, said detection and conversion means converting such detected light to electrical signals carrying information representative of the encoded information of said transported cards;

e. signal processing means for processing said electrical signals to provide digital signals representative of said encoded card information, said signal processing means having timing means synchronized.

i. in a first time relationship to the passage of said cards through said transport means for processing of transmissive mode cards and ii. in a second time relationship to the passage of said cards through said transport means for processing of reflective mode cards; and f. said signal processing means having column rate reading means adapted to read said cards according to a first column rate when in a first column mode and according to a second column rate when in a second column mode.

2. Apparatus as described in claim 1, wherein said detection and conversion means includes detection means positioned relative to said reflective source means for detecting secondary reflection from said reflective mode cards.

3. The apparatus as described in claim 1, wherein said signal processing means contains means for providing that said digital signals are substantially unresponsive to the magnitude of the light detected by said detection and conversion means, so that said digital signals are primarily a function of the sharpness of the edges of the mark which has been detected.

4. The apparatus as described in claim 3, wherein said signal processing means contains a differentiating circuit, and a level detector for detecting the magnitude of output of said differentiation circuit.

5. The apparatus as described in claim 1, wherein said signal processing means comprises a register for storing said electrical signals provided by said detection and conversion means, reset means for resetting said register, strobe means for strobing digital data from said register, and means for adjusting the relative timing between said reset signals and said strobe signals so as to adjust the window for reading data from a given encoded column one of said transported data cards.

6. The apparatus as described in claim 5, wherein one of said column reading modes provides for reading 40 column data, and wherein even reset signals and odd strobe signals are deleted.

7. The apparatus as described in claim 5 wherein said one of said column reading modes provides for reading 80 column data.

8. The apparatus as described in claim 1, wherein said column mode reading means includes means for reading 80 columns per card, means for reading 40 columns per card, and selection means for selecting the operating column reading mode.

9. Apparatus adapted for reading data cards having reflective mode marks encoded thereon comprising:

a. transport means for transporting data cards through said apparatus;

b. light source means for transmitting light onto said cards as they are being transported through said apparatus;

c. detection and conversion means positioned relative to said light source means and said transport means for detecting secondary reflection of light transmitted from said source means and reflected from said transported cards, and for converting such detected light to electrical signals carrying information representative of the encoded information on said transported cards; and d. signal processing means for operating on said electrical signals to produce output signals which are substantially unresponsive to the magnitude of the light detected by said detection and conversion means, so that said output signals are primarily a function of the sharpness of said marks, said signal processing means including differentiating means for differentiating said electrical signals and level detection means for detecting when said differentiated signals exceed a predetermined level.

* * * * *

UNITED STATES PATENT OFFICE
CERTIFICATE OF CORRECTION

Patent No. 3,896,294 Dated July 22, 1975

Inventor(s) John C. Schisselbauer and James E. Jacobs

It is certified that error appears in the above-identified patent and that said Letters Patent are hereby corrected as shown below:

Column 4, line 42, after "source", change "10" to --20--.
Column 5, line 8, after "suitably", change "as" to --an--; same line, after "is", change "an" to --in--.
Column 8, line 14, after "terminal", change "74" to --72--.
Column 8, line 22, after "Thus,", change "an" to --on--.
Column 8, line 65, after "output", insert --of--.

Signed and Sealed this

*fourteenth* Day of *October 1975*

[SEAL]

*Attest:*

RUTH C. MASON
*Attesting Officer*

C. MARSHALL DANN
*Commissioner of Patents and Trademarks*